June 14, 1938.   E. L. KELLER   2,120,311
DEMAND METER UNIT FOR WATT-HOUR METERS
Filed July 1, 1937   2 Sheets-Sheet 1

INVENTOR
Edward L. Keller
by his attorneys
Stebbins, Blenko & Parmelee

June 14, 1938.  E. L. KELLER  2,120,311
DEMAND METER UNIT FOR WATT-HOUR METERS
Filed July 1, 1937   2 Sheets-Sheet 2

INVENTOR
Edward L. Keller
by his attorneys
Stebbins, Blenko & Parmelee

Patented June 14, 1938

2,120,311

UNITED STATES PATENT OFFICE 2,120,311

DEMAND METER UNIT FOR WATT-HOUR METERS

Edward L. Keller, Pittsburgh, Pa.

Application July 1, 1937, Serial No. 151,356

2 Claims. (Cl. 171—34)

This invention relates to a demand meter for determining the magnitude of the load imposed upon an electrical distribution system by any consumer supplied therefrom and, in particular, to a register unit for watt-hour meters, having a demand meter incorporated therein. A watt-hour meter is provided on the premises of each consumer for measuring the energy used and my invention, which may readily be substituted for the register frame of the usual watt-hour meter, provides an indication of the maximum demand as well as the total consumption.

This is in part a continuation of my application Serial No. 702,777, filed December 16, 1933.

Demand meters of various types have been known heretofore and have been installed on large loads, as special meters, in addition to the integrating, energy-measuring watt-hour meters, for the purpose of fixing equitable rates. One such type of meter is provided with a thermal actuating means connected in series with the load being measured. Demand meter attachments have also been incorporated in watt-hour meter register frames so that, on substitution thereof for the usual watt-hour meter register, a demand indication, as well as an energy-consumption indication, is obtained.

The only type of demand meter which, to my knowledge, has heretofore been embodied in a register frame of a watt-hour meter, however, is the so-called "block interval" type which actually measures demand indirectly by measuring the energy consumed during a predetermined period of time. Such devices have been used to a considerable extent in spite of serious objections thereto. The use of such devices, however, has not approached the extent it would have if demand meter attachments not subject to the objections to the present type had been available. These objections include the high cost, the difficulty of maintenance, and the inherent inaccuracy which characterize the block interval type of demand meter. A further objection is the fact that it requires a mechanical connection to the watt-hour meter drive which may interfere with the accuracy of the watt-hour meter itself. Electric power companies desire to measure the demand of each customer, but this has not been possible, as a practical matter, because of the aforementioned objections to the only type of demand meter which has heretofore been incorporated in the register frame of a watt-hour meter, and it is not practical from the standpoint of cost, to provide a demand meter for each customer in addition to the watt-hour meter.

I have invented a demand meter unit for watt-hour meters which overcomes the aforementioned objections and is characterized by important features of novelty and advantage over such devices as have been known heretofore. In accordance with my invention, I provide a register unit which may be easily inserted in a watt-hour meter, and I embody in the unit a demand indicating pointer and a thermo-responsive member for advancing the pointer. I also provide means whereby the unit is adapted to be secured in a predetermined position relative to the watt-hour meter. The thermal element of the unit has terminals adapted to be interconnected with the watt-hour meter winding, whereby the load current passing through the meter also traverses the thermal element. I thus avoid the necessity for any mechanical connection between the watt-hour meter drive and the demand indicator.

For a complete understanding of the invention, reference is made to the accompanying drawings illustrating a present preferred embodiment. In the drawings:

Figure 1 is a front elevation of my demand meter unit for a watt-hour meter having certain parts broken away for clearness;

Figure 2 is a plan view;

Figure 3 is a sectional view along the line III—III of Figure 1;

Figure 5:
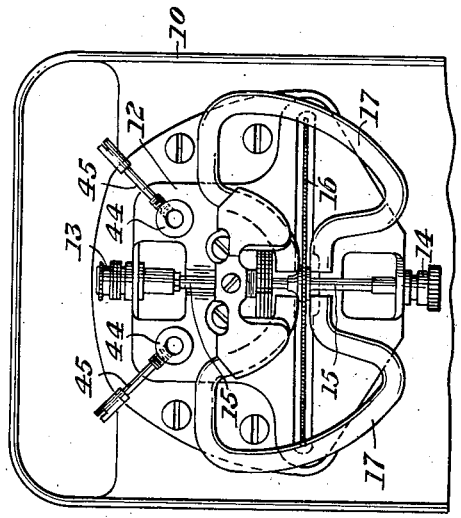
Figure 5 is a partial front elevation of a watt-hour meter showing the means for positioning and supporting the demand meter unit.

Referring now in detail to the drawings, a standard watt-hour meter comprises a base 10 to which a magnetic core is secured. Current and voltage windings are mounted on the core in the known manner. A bearing plate 12 is attached to the core and base and is provided with upper and lower bearings 13 and 14 for a shaft 15. An induction disc 16 is secured to the shaft and rotates within an air gap in the core. Drag magnets 17 cooperate with the induction disc 16.

A register frame 18 comprises a base or rear face 18a, top and bottom portions 18b and 18c and a front plate 18d. A face plate 18e spaced forwardly of the plate 18d and supported therefrom on out-turned lugs 18f, forms with the plate a register case 19. A register train 20 is mounted in the case 19 for driving pointers 21. The latter moves over dials 22 on a dial card mounted on the face plate. A gear train, indicated generally at 23, connects the shaft 15 to the register train 20.

In addition to the dials 22, the dial card on the face plate is also provided with a demand scale 24. A pointer 25 is pivoted at 26 for cooperation with the scale 24. A leaf spring 27 is adjusted to produce sufficient friction between the pointer 25 and its support 26 through a felt washer 28 so that the pointer 25 remains in any position to which it may be actuated, until reset. A shaft 29 is journaled in the register case coaxially with the pivotal support 26 of the pointer 25. The shaft 29 carries a crank 30 which, on rotation of the shaft 29, is adapted to engage the pointer and move it around the scale 24. A swinging arm 31 is pivoted in the register case on a shaft 32 and carries a gear segment 33. A pinion 34 on the shaft 29 meshes with the segment 33.

A thermally responsive element 35, a bimetallic strip, for example, is attached to an insulating block 36 mounted on the register case 19. The member 35 is preferably bifurcated from its fixed end, providing a conducting member of substantially U-shape. The outer or closed end of the strip 35 carries an insulating block 37 having a hole 38 therein. A finger 39 attached to the arm 31 extends into the hole 38.

Figure 6:
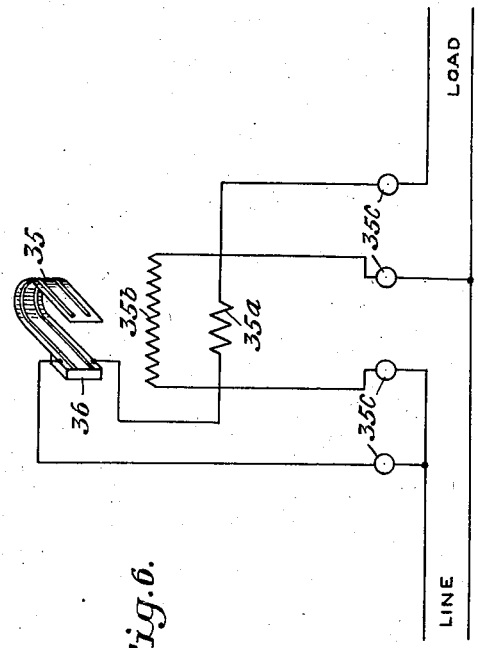
Figure 6 is a circuit diagram.
Figure 4:
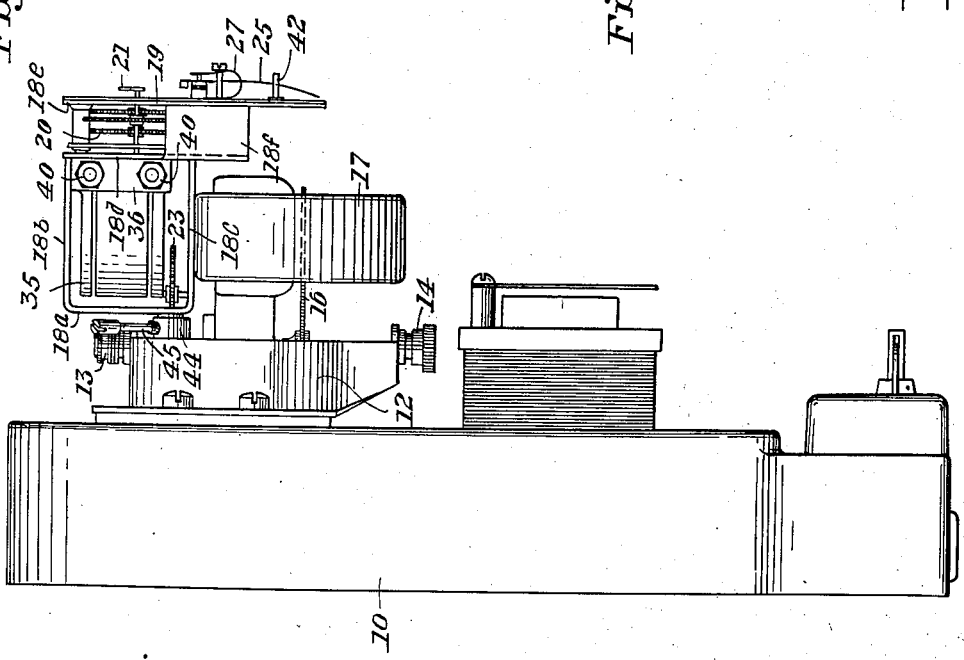
Figure 4 is a side elevation of a watt-hour meter having my demand meter unit incorporated therein.

Terminals 40 extend through the block 36 from the open ends of the member 35 and connections 41 extend therefrom to the load circuit of the meter. As shown in Figure 6, the member 35 is connected in series with the current coil 35a of the meter, the voltage coil being shown at 35b, and the meter terminals at 35c. Figure 6 also shows how the member 35 which is of hairpin shape, is slotted adjacent its upper and lower edges, the slots extending through the terminal end but not through the other, i. e., the freely floating end. The current path is thus around the upper edge of the element and back along the lower edge or vice versa. The heat generated in the portion of the members actually traversed by the current is effective upon the remainder thereof to produce a strong flexing force, while the desired resistance of the current path is obtained.

The unit is provided with supporting studs 43 projecting rearwardly from the base or back face 18a, adapted to be received in sockets 44 mounted on the bearing plate 12 and secured therein by set screws 45. By these means, the entire unit may be readily attached to the watt-hour meter.

In operation, the member 35 flexes to an extent determined by its temperature, which in turn depends on the amount of current flowing therethrough. Flexing of the member 35 shifts the arm 31 and thus turns the crank 30 to actuate the pointer 25. The pointer 25 remains in any position to which it is actuated until manually reset. It thus shows the maximum demand which has occurred between successive resettings. While the flexure of the member 35 is not exactly proportional to the heating, this can be easily taken care of by calibrating the scale 24 to conform with the deformation of the member for various demand units. It will be found that while the scale is somewhat crowded in the lower portion, it can be read very satisfactorily in the upper portion where the demand becomes of greater importance. The pointer 25 may be reset by the usual means from outside the meter case (not shown). A stop 42 limits the resetting movement of the pointer.

It will be apparent from the foregoing description that the invention provides a demand meter unit for watt-hour meters adapted to replace the usual register, which is extremely simple compared to previous devices of this character, and can therefore be made at a cost which is only a fraction of that of prior art devices. Since there are very few moving parts in my invention, the maintenance becomes a negligible matter. The ordinary integrating function of the watt-hour meter is not affected and the energy consumed by the demand indicating mechanism is very slight, much less than that required by the clockwork mechanism previously used. The thermal demand indicator is sufficiently accurate for all rate-making purposes and is not subject to a defect characteristic of block interval type demand meters, viz., the splitting of a short-time heavy load between two successive time periods with the result that the meter indicates a demand less than that actually imposed. The device of my invention, furthermore, avoids any connection with the drive of the watt-hour meter which eliminates any interference with the accuracy thereof. It also provides a direct measurement rather than an indirect measurement of demand since the thermal member is subject to the heating effect of the current traversing the current coil of the meter. The unit itself also has a mechanical interconnection with the structure of the watt-hour meter in which it is disposed. The thermal element, being disposed between spaced frame plates is protected against injury during handling and shipment.

The simplicity and low cost of the device make it possible for the first time to extend the benefits of demand measurement to practically every consumer with the result that the consumer obtains a fairer rate and the power company receives a return based accurately on the extent to which each customer uses the available facilities.

Although I have illustrated and described herein but one preferred embodiment of the invention, it will be apparent that numerous changes in the construction disclosed may be made without departing from the spirit of the invention as defined in the appended claims.

I claim:

1. A register unit for watt-hour meters including a frame, the frame having a base portion adapted to be secured to a watt-hour meter in predetermined positional relation thereto, a register face carried by the frame and having watt-hour indicating dials, pointers for the dials, a gear train mounted in the frame and actuating the pointers, the train including a gear adapted to mesh with a driven gear of the watt-hour meter when the frame is positioned thereon whereby the pointers indicate the watt-hour consumption, a maximum demand scale carried by the frame, a maximum demand-indicating pointer mounted to swing over the scale but having a drag so that it tends to remain stationary at any position to which it is moved, means for moving the pointer, a thermo-responsive element mounted on the frame and having at least one end electrically insulated from the frame, means connecting the pointer-moving means and the thermo-responsive element so that the maximum demand-indicating pointer is moved over the maximum demand scale upon heating of the thermo-responsive element but not on cooling thereof, electrical terminals mounted on the frame and adapted for connection to the electrical circuit of the watt-hour meter, at least one of the terminals being electrically insulated from the frame, and connections between the terminals and the thermo-responsive element whereby current passing therethrough may heat the same and indicate a maximum current demand.

2. A register unit for watt-hour meters including a frame, the frame having a base portion adapted to be secured to a watt-hour meter in predetermined positional relation thereto, a register face carried by the frame and having watt-hour indicating dials, pointers for the dials, a gear train mounted in the frame and actuating the pointers, the train including a gear adapted to mesh with a driven gear of the watt-hour meter when the frame is positioned thereon whereby the pointers indicate the watt-hour consumption, a maximum demand scale carried by the frame, a maximum demand-indicating pointer mounted to swing over the scale but having a drag so that it tends to remain stationary at any position to which it is moved, means for moving the pointer, a thermo-responsive element mounted on the frame, means connecting the pointer-moving means and the thermo-responsive element so that the maximum demand-indicating pointer is moved over the maximum demand scale upon heating of the thermo-responsive element but not on cooling thereof, electrical terminals mounted on the frame and adapted for connection to the electrical circuit of the watt-hour meter, at least one of the terminals being electrically insulated from the frame, and connections extending from the terminals whereby to heat the thermo-responsive element in accordance with the current traversing the meter and indicate a maximum current demand.

EDWARD L. KELLER.